United States Patent [19]

Lee, Jr.

[11] 4,077,934

[45] Mar. 7, 1978

[54] METHOD OF PREPARING COMPOSITIONS THAT COMPRISE A POLYPHENYLENE ETHER RESIN AND AN ALKENYL AROMATIC RESIN

[75] Inventor: Gim Fun Lee, Jr., Albany, N.Y.

[73] Assignee: General Electric Company, Pittsfield, Mass.

[21] Appl. No.: 645,531

[22] Filed: Dec. 31, 1975

[51] Int. Cl.² .............................................. C08K 5/52
[52] U.S. Cl. ................................ 260/30.6 R; 260/874
[58] Field of Search ............ 260/874, 47 ET, 30.6 R; 264/176 R

[56] References Cited

U.S. PATENT DOCUMENTS

| | | | |
|---|---|---|---|
| 3,629,378 | 12/1971 | Kodama et al. | 260/30.6 R |
| 3,639,506 | 2/1972 | Haaf | 260/874 |
| 3,890,406 | 6/1975 | Matsunaga | 260/874 |

*Primary Examiner*—Joseph L. Schofer
*Assistant Examiner*—Peter Kulkosky
*Attorney, Agent, or Firm*—Morgan, Finnegan, Pine, Foley & Lee

[57] ABSTRACT

A novel process is disclosed for preparing a composition which comprises a polyphenylene ether resin and an alkenyl aromatic resin. The process is based on preparing a preblend of the polyphenylene ether resin with a compound that reduces the alloying temperature of the polyphenylene ether resin, and thereafter combining the preblend with the alkenyl aromatic resin.

16 Claims, No Drawings

METHOD OF PREPARING COMPOSITIONS THAT COMPRISE A POLYPHENYLENE ETHER RESIN AND AN ALKENYL AROMATIC RESIN

This invention relates to a novel process for preparing a composition which comprises a polyphenylene ether resin and an alkenyl aromatic resin. The process comprises first forming a preblend of the polyphenylene ether resin with a compound that reduces the alloying temperature of the polyphenylene ether resin, and thereafter combining the preblend with the alkenyl aromatic resin.

BACKGROUND OF THE INVENTION

The term "polyphenylene ether resin" includes a family of polymers well known to those skilled in the art, and they are made by a variety of catalytic and non-catalytic processes from the corresponding phenols or reactive derivatives thereof. By way of illustration, certain of the polyphenylene ethers are disclosed in Hay, U.S. Pat. Nos. 3,306,874 and 3,306,875, and in Stamatoff, U.S. Pat. Nos. 3,257,357 and 3,257,358. In The Hay patents, the polyphenylene ethers are prepared by an oxidative coupling reaction comprising passing an oxygen-containing gas through a reaction solution of a phenol and a metal-amine complex catalyst. Other disclosures relating to processes for preparing polyphenylene ether resins, including graft copolymers of polyphenylene ethers with styrene type compounds, are found in Fox, U.S. Pat No. 3,356,761; Sumitomo, U.K. Pat. No. 1,291,609; Bussink et al., U.S. Pat. No. 3,337,499; Blanchard et al., U.S. Pat. No. 3,219,626; Laakso et al., U.S. Pat. No. 3,342,892; Borman, U.S. Pat. No. 3,344,166; Hori et al., U.S. Pat. No. 3,384,619; Faurote et al., U.S. Pat. No. 3,440,217; and disclosures relating to metal based catalysts which do not include amines, are known from patents such as Wieden et al., U.S. Pat. No. 3,442,885 (copper-amidines); Nakashio et al., U.S. Pat. No. 3,573,257 (metal-alcoholate or -phenolate); Kobayashi et al., U.S. Pat No. 3,455,880 (cobalt chelates); and the like. In the Stamatoff patents, the polyphenylene ethers are produced by reacting the corresponding phenolate ion with an initiator, such as peroxy acid salt, an acid peroxide, a hypohalite, and the like, in the presence of a complexing agent. Disclosures relating to non-catalytic processes, such as oxidation with lead dioxide, silver oxide, etc., are described in Price et al., U.S. Pat. No. 3,382,212. Cizek, U.S. Pat. No. 3,383,435 discloses polyphenylene ether-styrene resin compositions. All of the above-mentioned disclosures are incorporated herein by reference.

One of the outstanding properties of the polyphenylene ether resins is the property of high-heat resistance which makes possible the use of this resin in applications where many thermoplastics would fail. This exceptional property, while desirable in a finished article, causes problems when melt blending is used to form compositions that include the polyphenylene ether resins. One problem is related to the fact that the high temperatures required for the processing of the polyphenylene ethers approach the temperatures at which additives begin to degrade. Materials such as alkenyl aromatic resins fall within this class. This fact has made it desirable to find a material that will allow lower blending and molding temperatures to be used without adversely affecting the properties of the molded article. It has now been found that if certain compounds such as phthalates and phosphates are first blended with a polyphenylene ether resin, to form a preblend, the preblend may be further processed at temperatures that are substantially below the softening temperature of the polyphenylene ether resin.

In the prior art, compositions which have included a polyphenylene ether resin, a phosphate compound and an alkenyl aromatic resin are known. These compositions are disclosed in U.S. Pat. No. 3,639,506. However, these compositions have been prepared by first dry blending all of the components and extruding the composition at the temperature which is necessary to cause the polyphenylene ether resin to flow. This method of preparing the composition often results in a "pock marked" product that is due to "unmelted" polyphenylene ether resin which did not achieve a low enough viscosity to intimately combine with the other components of the composition. The present invention overcomes this problem as the preblend of the polyphenylene ether resin and the compound that reduces the alloying temperature of the polyphenylene ether resin alloys with the alkenyl aromatic resin to form a very uniform composition at a temperature that does not degrade any of the components of the composition.

It is, therefore, a primary object of this invention to provide an improved method of preparing compositions of a polyphenylene ether resin and an alkenyl aromatic resin.

DETAILED DESCRIPTION OF THE INVENTION

This invention provides a method of preparing a thermoplastic composition which comprises:
 (a) a polyphenylene ether resin; and
 (b) an alkenyl aromatic resin.

The method comprises first combining the polyphenylene ether resin with an amount of a compound that is sufficient to reduce the alloying temperature of the polyphenylene ether resin to form a preblend and thereafter combining said preblend with the alkenyl aromatic resin to form the thermoplastic composition.

The polyphenylene ether resins are preferably of the formula:

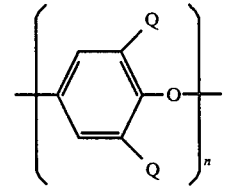

wherein the oxygen atom of one unit is connected to the benzene nucleus of the next adjoining unit; $n$ is the degree of polymerization and is at least 50; and each Q is a monovalent substituent selected from hydrogen, halogen, hydrocarbon radicals, halohydrocarbon radicals having at least two carbon atoms between the halogen atom and the phenyl nucleus.

The preferred polyphenylene ether resin is poly(2,6-dimethyl-1,4-phenylene ether) resin.

The compounds that may be employed to reduce the alloying temperature of the polyphenylene ether resin are selected from the group consisting of o,p-toluene sulfonamide and substituted derivatives thereof, alkyl esters of trimellitic acid, hydrogenated terphenyl, epoxy stearates, epoxy tetrahydrophthalates, expoxidized oils, mineral oil, phosphate plasticizers and phthalate plasticizers.

The substituted derivatives of o,p-toluene sulfonamide include N-ethyl-o,p-toluenesulfonamide and N-cyclohexyl-p-toluenesulfonamide. Other substituted derivatives having straight and branched chain alkyl groups of 1–10 carbon atoms on the N atom may also be employed.

The alkyl esters of trimellitic acid include those esters having straight and branched chain alkyl groups of 1–10 carbon atoms. Examples of these esters also include tri-2-ethylhexyl trimellitate, n-octyl trimellitate and triisodecyl trimellitate.

The epoxy stearates include epoxy butyl stearate, epoxy n-hexyl stearate, epoxy isooctyl stearate and other epoxidized alkyl stearates wherein the alkyl group is a straight or branched chain hydrocarbon group having from 1 to 10 carbon atoms. The epoxy tetrahydrophthalates include the epoxidized alkyl tetrahydrophthalates wherein the alkyl group is a straignt or branched chain hydrocarbon group having from 1 to 10 carbon atoms such as epoxy 2-ethylhexyl tetrahydrophthalates and epoxy isodecyl tetrahydrophthalates.

The epoxidized oils include epoxidized soybean oil and 2-ethylhexyl tallate.

The alkenyl aromatic resins include those in which at least 25% of the units of the alkenyl resin are derived from a monomer of the formula:

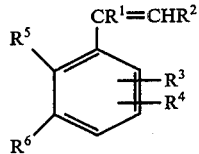

wherein $R^1$ and $R^2$ are selected from the group consisting of lower alkyl or alkenyl groups of from 1 to 6 carbon atoms and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl and alkenyl groups of from 1 to 6 carbon atoms or $R^5$ and $R^6$ may be concatenated together with hydrocarbyl groups to form a naphthyl group, said compounds being free of any substituent that has a tertiary carbon atom.

Materials that may be copolymerized with the vinyl aromatic monomer include those having the general formula:

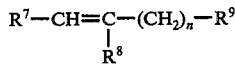

wherein $R^7$ and $R^8$ represent a substituent selected from the group consisting of hydrogen, halogen, an alkyl group of 1–4 carbon atoms, carboalkoxy having from 1–4 carbon atoms or $R^7$ and $R^8$ taken together represent an anhydride linkage (—COOOC—) and $R^9$ is hydrogen, vinyl and alkyl or alkenyl group having 1–12 carbon atoms, cycloalkyl having 3–6 carbon atoms, carboalkoxy having 2 to 6 carbon atoms, alkoxy-alkyl having 2 to 6 carbon atoms, alkylcarboxy having 2 to 6 carbon atoms, ketoxy, halogen, carboxy having 1 to 6 carbon atoms, cyano or pyridyl and $n$ is a whole number between 0 and 9.

The general formulas set forth above include by way of example, homopolymers such as homopolystyrene and monochloropolystyrene, the modified polystyrenes, such as rubber-modified, high-impact polystyrene and the styrene containing copolymers, such as the styrene acrylonitrile copolymers, styrene butadiene copolymers, styrene acrylonitrile -α-alkyl styrene copolymers, styrene-acrylonitrile-butadiene copolymers, poly-α-methylstyrene, copolymers of ethylvinylbenzene, divinylbenzene and styrene maleic anhydride copolymers and block copolymers of styrene-butadiene and styrene-butadiene-styrene.

The styrene-maleic anhydride copolymers are described in U.S. Pat. Nos. 3,971,939; 3,336,267 and 2,769,804 which are hereby incorporated by reference.

The rubber-modified, high-impact styrene resins are preferred and these may be made by well known procedures with rubbers such as nitrile rubbers, polybutadiene rubber, styrene-butadiene rubber, polysulfide rubber, ethylene propylene copolymers, propylene oxide and EPDM. These materials are well known and many are commercially available.

The phosphate compound may be selected from compounds of the formula:

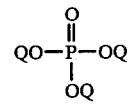

where such Q represents the same or different radicals that are selected from the group consisting of alkyl, such as straight and branched chain alkyl of from 1 to 10 carbon atoms such as methyl, propyl, n-butyl, hexyl, heptyl and the like; cycloalkyl such as those cycloalkyl radicals having from 1 to 8 carbon atoms such as cyclopropyl, cyclobutyl, cyclohexyl and the like; aryl such as those aryl radicals having from 6 to 14 carbon atoms such as phenyl and naphthyl; alkyl substituted aryl such as those radicals having from 1 to 5 straight or branched chain alkyl radicals having from 1 to 10 carbon atoms on a phenyl or naphthyl nucleus, e.g., 2-methylphenyl, 4-n-butylphenyl, 2-ethylphenyl and the like; aryl substituted alkyl such as phenyl or naphthyl substituted straight or branched chain alkyl radicals having from 1 to 10 carbon atoms such as benzyl, phenethyl, phenpropyl and the like; hydroxy alkyl having from 1 to 10 carbon atoms such as 2-hydroxyethyl, 4-hydroxyhexyl and the like; hydroxyaryl such as hydroxyphenyl or hydroxynaphthyl, e.g., 4-hydroxyphenyl and the like; hydroxyalkaryl such as cresyl, 4-ethyl-2-hydroxyphenyl and the like; halogen such as chloro, bromo or fluoro; and hydrogen.

The phosphates may be selected from cresyl diphenyl phosphate, 2-ethylhexyl diphenyl phosphate, tricresyl phosphate, triiosopropylphenyl phosphate, triphenyl phosphate, triethyl phosphate, dibutyl phenyl phosphate, diethyl phosphate, cresyl diphenyl phosphate, isooctyl diphenyl phosphate, tributyl phosphate, 2-ethylhexyl diphenyl phosphate, isodecyl diphenyl phosphate, isodecyl dicresyl phosphate, didecyl cresyl phosphate, tri-n-hexyl phosphate, di-n-octyl phenyl phosphate, di-2-ethylhexyl phenyl and tri-2-ethylhexyl phosphate or mixtures thereof.

Phosphates such as triphenyl phosphate will exhibit good compatibility with polyphenylene ethers up to 40 parts of triphenyl phosphate, per 100 parts of total composition. At higher concentrations, the polyphenylene ether tends to separate from these compositions. Alkylated aryl phosphates such as isopropylated triphenyl phosphate have better compatibility with polyphenylene ethers and may be employed at higher levels with better compatibility.

The phthalate compound may be of the formula:

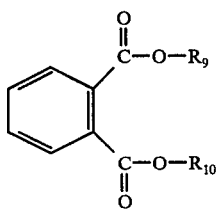

wherein $R_9$ and $R_{10}$ are independently selected from the group consisting of alkyl, such as straight and branched chain alkyl radicals of from 1 to 30 carbon atoms such as methyl, ethyl, propyl, n-butyl, n-hexyl, octyl, decyl, undecyl, tridecyl and the like; aryl such as those aryl radicals having from 6 to 14 carbon atoms such as phenyl and naphthyl; cycloalkyl such as those cycloalkyl radicals having from 1 to 8 carbon atoms such as cyclopropyl, cyclobutyl, cyclohexyl and the like; alkaryl such as those radicals having from 1 to 5 straight or branched chain alkyl radicals having from 1 to 10 carbon atoms on a phenyl or naphthyl, e.g. 2-methylphenyl, 4-n-butylphenyl, 2-n-hexylphenyl and the like; aralkyl such as phenyl or naphthyl substituted straight or branched chain alkyl radicals having from 1 to 10 carbon atoms such as benzyl, phenethyl, phenpropyl and the like; hydroxyalkyl having from 1 to 10 carbon atoms such as 2-hydroxyethyl, 4-hydroxyhexyl and the like; hydroxyaryl such as hydroxyphenyl or hydroxynaphthyl e.g. 4-hydroxyphenyl and the like; hydroxy alkaryl such as cresyl 4-hydroxyphenyl and the like.

Particular phthalates include dibenzyl phthalate, phenyl cresyl phthalate, diethyl phthalate, dimethyl phthalate, phenyl benzyl phthalate, butyl benzyl phthalate, butyl cyclohexyl phthalate, dibutyl phthalate, octyl cresyl phthalate, diphenyl phthalate, di-n-hexyl phthalate, disohexyl phthalate, butyl octyl phthalate, butyl decyl phthalate, diisooctyl phthalate, di-2-ethylhexyl phthalate, di-n-octyl phthalate, diisononyl phthalate, diisodecyl phthalate, di-2-propyl heptyl phthalate, di-n-nonyl phthalate, di-n-decyl phthalate, diundecyl phthalate and ditridecyl phthalate.

Generally, the process of the invention is useful in preparing compositions that comprise from 1–99 parts by weight of the polyphenylene ether resin and from 99–1 parts by weight of the alkenyl aromatic resin.

An essential feature of the invention relates to the preparation of a preblend of the polyphenylene ether resin and the compound that reduces the alloying temperature of the polyphenylene ether resin. This may be done by coextruding the polyphenylene ether resin and the selected compound through an extruder at temperatures of about 475°–525° F. The temperatures required for making the preblend are substantially less than the temperatures that would be required if all of the components were powder blended and coextruded at one time. That procedure usually requires an extrusion temperature of about 600° F and even at that temperature it is not always possible to obtain homogenous blends. Generally from 15 to 50 parts of the compound that reduces the alloying temperature of the polyphenylene ether resin is employed per 100 parts of the preblend of the polyphenylene ether resin and said compound. The preferred range is 20–30 parts.

The preblend may then be blended with the alkenyl aromatic resin. This may be carried out at a temperature below that at which the preblend of the polyphenylene ether resin and the organic phosphate is prepared. Generally temperatures in the range of 450°–500° F may be used for this process step.

A one or two-stage extruder may be employed in the practice of the invention. If a two-stage extruder is employed, the polyphenylene ether resin and the organic phosphate are blended in the first stage and the alkenyl aromatic resin is added to the second stage. Other additives may be employed such as processing aids, pigments, stabilizers, reinforcing agents such as 1–80% of filamentous glass, additional flame retardants and the like. These additives may be added with the alkenyl aromatic resin to the preblend or they may be added in a subsequent extrusion.

DESCRIPTION OF THE PREFERRED EMBODIMENT

EXAMPLE I

A blend of 78 parts by weight of poly(2,6-dimethyl-1,4-phenylene ether) resin having an intrinsic viscosity of about 0.5 as measured in chloroform at 30° C and 22 parts by weight of triphenyl phosphate was prepared by extruding a powder blend of these materials through a Werner-Pfleiderer twin-screw extruder at 500° F. The preblend was then extruded at a set temperature of 450° F in a Werner-Pfleiderer twin-screw extruder (maximum melt temperature reached was 490° F) with a rubber-modified, high-impact polystyrene (Foster Grand 834 containing about 8% polybutadiene rubber) to make the following compositions:

|   | Preblend* | Rubber-Modified Polystyrene |
|---|---|---|
| A | 64 | 50 |
| B | 77 | 40 |

*all parts by weight

These compositions had the following physical properties:

|   | A | B |
|---|---|---|
| Tensile Yield, psi × $10^{-3}$ | 8.2 | 8.7 |
| Tensile Strength, psi × $10^{-3}$ | 7.7 | 7.6 |
| Tensile Elongation, % | 74 | 76 |
| Izod Impact, ft. lbs./in.n | 5.4 | 5.2 |
| Gardner Impact, in./lbs. | 142 | 154 |
| UL-94 flame out times, sec/sec. | 7.3/5 | 4.3/4.3 |

EXAMPLE II

Using the procedure and materials of Example I a preblend was prepared that consisted of 85 parts by weight of a polyphenylene ether resin and 15 parts by weight of triphenyl phosphate. The preblend was then combined with the rubber-modified polystyrene to form the following compositions:

|   | Preblend | Rubber-Modified Polystyrene |
|---|---|---|
| C | 59 | 50 |
| D | 71 | 40 |

These compositions had the following physical properties:

|   | C | D |
|---|---|---|
| Tensile Yield, psi × $10^{-3}$ | 8.9 | 9.6 |
| Tensile Strength, psi × $10^{-3}$ | 8.2 | 8.3 |
| Tensile Elongation, % | 68 | 61 |
| Izod Impact, ft.lbs./in.n | 4.7 | 4.7 |
| Gardner Impact, in./lbs. | 132 | 122 |
| UL-94 flame out times, sec/sec. | 8/6 | 5.3/6.3 |

EXAMPLE III

Using the procedures and materials of Example I, the following materials were preblended with poly(2,6-dimethyl-1,4-phenylene ether) at 450° F to form pellets and thereafter these pellets were re-extruded at the same conditions with the same rubber modified polystyrene that was employed in Example I to give a preblend to rubber modified polystyrene ratio of 64/50 (parts by weight):

|   | Alloying Aid |
|---|---|
| E | Mineral oil[1] |
| F | hydrogenated terphenyl[2] |
| G | dioctyl adipate[3] |
| H | butyl phthalyl butyl glycolate[4] |
| I | trimellitate[5] |
| J | monomeric epoxy plasticizer[6] |

[1]Kaydol, Witco
[2]HB-40, Monsanto
[3]Monsanto
[4]Santicizer B-16, Monsanto
[5]Santicizer 79TM, Monsanto, a trimellitate ester based on a mixture of $C_7$-$C_9$ essentially straight chain alcohols.
[6]Monoplex S-75, Rohm & Haas These compositions had the following physical properties:

|   | E | F | G | H | I | J |
|---|---|---|---|---|---|---|
| Tensile Yield, psi × $10^{-3}$ | 7.0 | 7.6 | 6.0 | 7.2 | 7.3 | 6.9 |
| Tensile Strength, psi × $10^{-3}$ | 6.9 | 7.7 | 6.1 | 7.0 | 7.3 | 7.0 |
| Tensile Elongation, % | 50 | 44 | 76 | 85 | 63 | 86 |
| Izod Impact, ft. lbs./in.n | 5.7 | 4.8 | 6.5 | 5.5 | 5.0 | 5.9 |
| Gardner Impact, in./lbs. | 202 | 112 | 201 | 182 | 173 | 203 |

Although the above examples have shown various modifications of the present invention, other variations are possible in light of the above teachings. It is, therefore, to be understood that changes may be made in the particular embodiments of the invention described which are within the full intended scope of the invention as defined by the appended claims.

I claim:

1. A method of preparing a thermoplastic composition which comprises:
   (a) a polyphenylene ether resin; and
   (b) an alkenyl aromatic resin; said method comprising first combining the polyphenylene ether resin with a phosphate compound that reduces the alloying temperature of the polyphenylene ether resin to form a preblend and thereafter combining said preblend with the alkenyl aromatic resin to form the thermoplastic composition.

2. The method of claim 1 wherein said polyphenylene ether resin is of the formula:

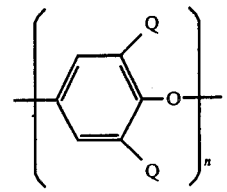

wherein the oxygen ether atom of one unit is connected to the benzene nucleus of the next adjoining unit; $n$ is the degree of polymerization; and each Q is a monovalent substituent selected from hydrogen, halogen, hydrocarbon radicals, halohydrocarbon radicals having at least two carbon atoms between the halogen atom and the phenyl nucleus.

3. The method of claim 2 wherein at least 25% of the units of the alkenyl aromatic resin are derived from a monomer of the formula:

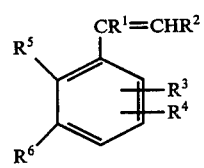

wherein $R^1$ and $R^2$ are selected from the group consisting of lower alkyl or alkenyl groups of from 1 to 6 carbon atoms and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl and alkenyl groups of from 1 to 6 carbon atoms or $R^5$ and $R^6$ may be concatenated together with hydrocarbyl groups to form a naphthyl group, said compounds being free of any substituent that has a tertiary carbon atom.

4. The method of claim 3 wherein a phosphate compound of the formula:

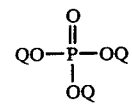

wherein each Q represents the same or different radicals that are selected from the group consisting of alkyl, aryl, alkyl substituted aryl, aryl substituted alkyl, hydroxyalkyl, hydroxyaryl and hydroxyalkaryl is employed as the compound that reduces the alloying temperature of the polyphenylene ether resin.

5. The method of claim 4 wherein said composition is formed by making the preblend in a first pass through an extruder and thereafter adding the alkenyl aromatic resin in a second pass through an extruder.

6. The method of claim 5 wherein the temperature of the second extrusion is lower than the temperature of the first extrusion.

7. The method of claim 4 wherein said composition is formed in a two-stage extruder wherein the polyphenylene ether resin and the phosphate compound are combined in the first stage and the alkenyl aromatic resin is added in the second stage components (a) and (b) are combined in the first stage and component (c) is added at the second stage.

8. The method of claim 2 wherein the compound that reduces the alloying temperature is triphenylphosphate.

9. A method according to claim 1 of preparing a thermoplastic composition which comprises:
(a) a polyphenylene ether resin; and
(b) an alkenyl aromatic resin; said method comprising first combining the polyphenylene ether resin with a compound that reduces the alloying temperature of the polyphenylene ether resin at a temperature from about 475°–525° F to form a preblend and thereafter combining said preblend with the alkenyl aromatic resin to form the thermoplastic composition at a temperature from about 450°–500° F.

10. The method of claim 9 wherein said polyphenylene ether resin is of the formula:

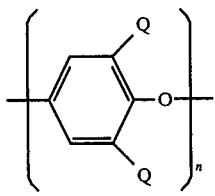

wherein the oxygen ether atom of one unit is connected to the benzene nucleus of the next adjoining unit; $n$ is the degree of polymerization; and each Q is a monovalent substituent selected from hydrogen, halogen, hydrocarbon radicals, halohydrocarbon radicals having at least two carbon atoms between the halogen atom and the phenyl nucleus.

11. The method of claim 10 wherein at least 25% of the units of the alkenyl aromatic resin are derived from a monomer of the formula:

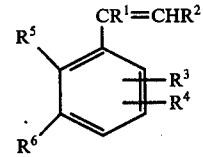

wherein $R^1$ and $R^2$ are selected from the group consisting of lower alkyl or alkenyl groups of from 1 to 6 carbon atoms and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl and alkenyl groups of from 1 to 6 carbon atoms or $R^5$ and $R^6$ may be concatenated together with hydrocarbyl groups to form a naphthyl group, said compounds being free of any substituent that has a tertiary carbon atom.

12. The method of claim 11 wherein a phosphate compound of the formula:

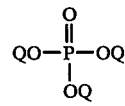

wherein each Q represents the same or different radicals that are selected from the group consisting of alkyl, aryl, alkyl substituted aryl, aryl substituted alkyl, hydroxyalkyl, hydroxyaryl and hydroxyalkaryl is employed as the compound that reduces the alloying temperature of the polyphenylene ether resin.

13. The method of claim 12 wherein said composition is formed by making the preblend in a first pass through an extruder and thereafter adding the alkenyl aromatic resin in a second pass through an extruder.

14. The method of claim 13 wherein the temperature of the second extrusion is lower than the temperature of the first extrusion.

15. The method of claim 12 wherein said composition is formed in a two-stage extruder wherein the polyphenylene ether resin and the phosphate compound are combined in the first stage and the alkenyl aromatic resin is added in the second stage components (a) and (b) are combined in the first stage and component (c) is added at the second stage.

16. The method of claim 10 wherein the compound that reduces the alloying temperature is triphenylphosphate.

* * * * *

UNITED STATES PATENT OFFICE
CERTIFICATE OF CORRECTION

Patent No. 4,077,934      Dated March 7, 1978

Inventor(s) Gim Fun Lee, Jr.

It is certified that error appears in the above-identified patent and that said Letters Patent are hereby corrected as shown below:

Column 3, line 12, "n-octyl trimellitate" should read --n-octyl, n-decyl trimellitate--.

Column 8, claim 7, line 66, after "stage" insert --.-- and delete rest of claim.

Column 10, claim 15, line 45, after "stage" insert --.-- and delete rest of claim.

Signed and Sealed this

Twenty-first Day of November 1978

[SEAL]

Attest:

RUTH C. MASON
Attesting Officer

DONALD W. BANNER
Commissioner of Patents and Trademarks